No. 647,639. Patented Apr. 17, 1900.
W. T. VOSE.
POTATO DIGGER.
(Application filed Feb. 1, 1900.)
(No Model.)

WITNESSES
A. N. Bonney,
E. A. Swett.

INVENTOR
William T. Vose,
By his Att'y.
Henry W. Williams

UNITED STATES PATENT OFFICE.

WILLIAM T. VOSE, OF NEWTON, MASSACHUSETTS.

POTATO-DIGGER.

SPECIFICATION forming part of Letters Patent No. 647,639, dated April 17, 1900.

Application filed February 1, 1900. Serial No. 3,581. (No model.)

*To all whom it may concern:*

Be it known that I, WILLIAM T. VOSE, a citizen of the United States, residing in Newton, in the county of Middlesex and State of Massachusetts, have invented a new and useful Improvement in Potato-Diggers, of which the following is a specification.

This improvement relates to potato-diggers which are adapted to be operated by hand; and it consists of a novel construction in which the ordinary hand-digger is combined with an attachment whereby a fulcrum and a rest are obtained, enabling the operator to secure the advantages of a leverage when the potatoes are lifted out of the ground by the tines and a rest or support when the potatoes are shaken for the purpose of dislodging the earth which clings to them.

The nature of the invention is fully described below, and illustrated in the accompanying drawings, in which—

Figure 1:
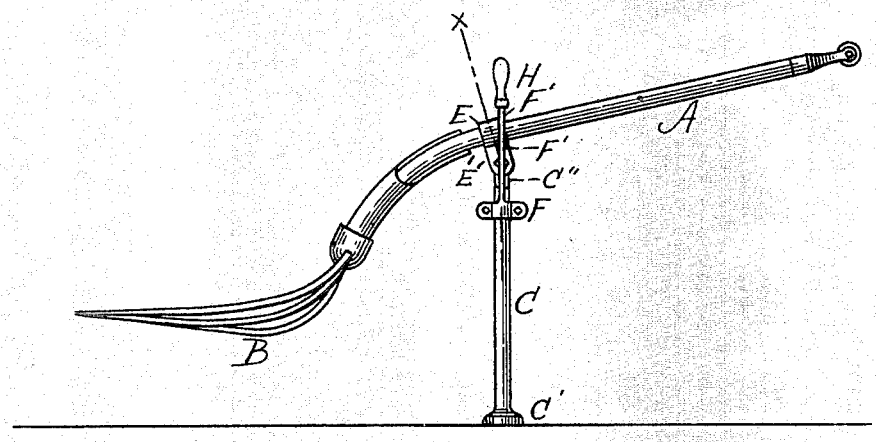
Figure 2:
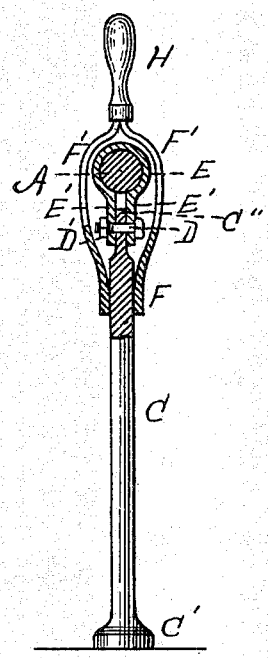

Figure 1 is an elevation of my improved device with the fulcrum-rod resting on the ground and the tines or fork of the digger raised. Fig. 2 is a section taken on line X, Fig. 1.

A represents a handle, and B the tines or fork, of a hand potato-digger.

C is an upright post or fulcrum-rod formed, preferably, with the broad foot C' and with its upper end C" flattened and pivotally connected by means of the bolt D and nut D' with the ears E' extending down from the clamp or metallic strap E, which is permanently applied to the handle A, as shown. A clamp F is secured by bolts or other suitable means to the fulcrum-rod C, and from opposite sides of this clamp a pair of integral rods F' extend, said rods curving outward sufficiently to clear the handle and the clamp E thereon and uniting at their upper ends in a handle H.

In using the implement the tines are thrust into the ground under the potatoes in the ordinary way. Then the handle A is raised with the right hand to loosen the potatoes. The fulcrum-rod is then adjusted by the left hand with its foot on the ground, as shown. Next, the left hand grasping the handle H to steady it, the handle A is pressed by the right hand and the tines bearing the potatoes raised into the position indicated in Fig. 1, and, last, the hands being in the same position the digger is shaken to remove the earth from the potatoes.

The foot C' is made broad enough to prevent the fulcrum-rod from being pressed into the ground.

Having thus fully described my invention, what I claim, and desire to secure by Letters Patent, is—

In a hand potato-digger, the handle A provided with suitable tines; the fulcrum-rod C pivotally connected at its upper end to the handle; and the rods F' rigidly secured at their lower ends to the fulcrum-rod, extending up above and clearing the handle A and provided with a suitable handle H, substantially as described.

WILLIAM T. VOSE.

Witnesses:
HENRY W. WILLIAMS,
A. N. BONNEY.